US006467602B2

(12) United States Patent
Bench et al.

(10) Patent No.: US 6,467,602 B2
(45) Date of Patent: Oct. 22, 2002

(54) ELECTROMECHANICAL PARKING METER DOOR COMMUNICATIONS INTERFACE

(75) Inventors: James D. Bench, Roanoke, VA (US); David G. Lefevers, Roanoke, VA (US); Gary Hoss, Roanoke, VA (US); J. Michael Lumpkin, Roanoke, VA (US); Gregory E. Chauvin, Hatchett Lake (CA)

(73) Assignees: Medeco Security Locks, Inc., Salem, VA (US); J.J. Mackay Canada Limited, Nova Scotia (CA)

( * ) Notice: Subject to any disclaimer, the term of this patent is extended or adjusted under 35 U.S.C. 154(b) by 0 days.

(21) Appl. No.: 09/837,175

(22) Filed: Apr. 19, 2001

(65) Prior Publication Data

US 2001/0037928 A1 Nov. 8, 2001

Related U.S. Application Data

(60) Provisional application No. 60/198,385, filed on Apr. 19, 2000, and provisional application No. 60/242,142, filed on Oct. 23, 2000.

(51) Int. Cl.[7] .................................... G06F 19/00

(52) U.S. Cl. ....................... 194/217; 194/900; 194/902; 368/90; 70/278.2

(58) Field of Search ................................ 194/900, 902, 194/217; 368/90; 70/278.3, 278.2, 283, 283.1

(56) References Cited

U.S. PATENT DOCUMENTS

| | | | | | |
|---|---|---|---|---|---|
| 4,369,442 A | | 1/1983 | Werth et al. | | |
| 4,438,426 A | | 3/1984 | Adkins | | |
| 4,697,171 A | | 9/1987 | Suh | | |
| 4,738,334 A | | 4/1988 | Weishaupt | | |
| 4,767,338 A | * | 8/1988 | Dennis et al. | 439/455 | |
| 4,789,859 A | | 12/1988 | Clarkson et al. | | |
| 4,823,928 A | * | 4/1989 | Speas | 136/291 | |
| 4,829,296 A | * | 5/1989 | Clark et al. | 232/7 | |
| 4,895,238 A | * | 1/1990 | Speas | 194/319 | |
| 4,936,436 A | * | 6/1990 | Keltner | 194/318 | |
| 4,967,895 A | * | 11/1990 | Speas | 194/200 | |
| 5,003,520 A | * | 3/1991 | Grieu et al. | 194/902 | |
| 5,045,675 A | * | 9/1991 | Curry | 235/441 | |
| 5,088,073 A | * | 2/1992 | Speas | 368/90 | |
| 5,103,957 A | * | 4/1992 | Ng et al. | 194/217 | |
| 5,109,972 A | * | 5/1992 | Van Horn et al. | 194/217 | |
| 5,139,128 A | | 8/1992 | Carmen et al. | | |
| 5,201,396 A | | 4/1993 | Chalabian et al. | | |
| 5,442,348 A | * | 8/1995 | Mushell | 194/205 | |
| 5,477,952 A | | 12/1995 | Castellano et al. | | |
| 5,498,859 A | * | 3/1996 | Farmont | 194/214 | |
| 5,520,275 A | * | 5/1996 | Foglino | 194/217 | |
| 5,605,066 A | | 2/1997 | Hurskainen | | |
| 5,648,906 A | * | 7/1997 | Amirpanahi | 194/217 | |
| 5,745,044 A | * | 4/1998 | Hyatt et al. | 340/5.23 | |
| 5,819,563 A | * | 10/1998 | Bianco | 70/278.3 | |
| 6,005,487 A | * | 12/1999 | Hyatt et al. | 221/7 | |
| 6,037,880 A | * | 3/2000 | Manion | 194/902 | |
| 6,116,506 A | | 9/2000 | Matsumoto et al. | | |
| 6,209,367 B1 | | 4/2001 | Hyatt, Jr. et al. | | |
| 6,230,868 B1 | | 5/2001 | Tuxen et al. | | |

* cited by examiner

*Primary Examiner*—Donald P. Walsh
*Assistant Examiner*—Jeffery Shapiro
(74) *Attorney, Agent, or Firm*—Rothwell, Figg, Ernst & Manbeck

(57) ABSTRACT

An electronic security system for a parking meter includes a vault door having a spring-biased contact terminal for making breakable electrical contact with a housing hinge bracket contact terminal mounted in a vault opening. An electronic lock control circuit is able to communicate with a meter control (coin counting/auditing) circuit in the meter portion of the system through the vault door/housing hinge bracket contact terminals, thus eliminating a direct cable connection between the lock circuit and the meter circuit. The spring-biased contact may be substituted by equivalent breakable electrical contacts such as optocoupler contacts.

11 Claims, 11 Drawing Sheets

| METER | | LOCK | | HHC | OPERATION |
|---|---|---|---|---|---|
| TIME PURCHASED | ⇒TYPE COIN⇒ | UPDATE COIN DATA | | | METER OPERATION |
| | ⇐UPDATE SUCCESSFUL⇐ | | | | |
| WAIT FOR PURCHASE | | POWER DOWN | | | |
| | | | | | |
| METER STATUS CHANGE | ⇒POWER LOCK⇒ | POWER UP | | | |
| | ⇐READY⇐ | | | | |
| | ⇒SEND NEW STATUS⇒ | STORE STATUS | | | |
| | ⇐ACK⇐ | | | | |
| | | | | | |
| | ⇐COLLECTION WAKE UP⇐ | WAKE UP | | KEY INSERTED | COLLECTION(DOOR OPEN) |
| | | | ⇒CHALLENGE⇒ | | |
| | | | ⇐RESPONSE⇐ | | |
| | | CORRECT RESPONSE | ⇒ACKNOWLEDGE⇒ | | |
| STORE NEW TIME | ⇐NEW TIME⇐ | | ⇐NEW TIME/OPEN⇐ | | |
| | ⇒ACKNOWLEDGE⇒ | OPEN LOCK | ⇒COIN DATA, TOTAL eCASH, METER STATUS, METER ID, METER PROFILE, METER ZONE⇒ | | |
| | ⇐COLLECTION DONE⇐ | | ⇐ACK⇐ | | |
| | | | | | |
| | | | | KEY INSERTED | FULL AUDIT(DOOR CLOSED) |
| | | | ⇒CHALLENGE⇒ | | |
| | | | ⇐RESPONSE⇐ | | |
| | | CORRECT RESPONSE | ⇒ACKNOWLEDGE⇒ | | |
| | ⇐AUDIT CMD⇐ | | ⇐AUDIT CMD⇐ | | |

FIG. 9A

| METER | | LOCK | | HHC | |
|---|---|---|---|---|---|
| | ⇒PASS THRU MODE⇒ | LOCK IN PASS THRU MODE. HHC TALKS DIRECTLY TO METER | ⇒PASS THRU MODE⇒ | | |
| | ⇐PROVIDE AUDIT⇐ | PASS THRU | ⇐PROVIDE AUDIT⇐ | | |
| | ⇒AUDIT DATA⇒ | PASS THRU | ⇒AUDIT DATA⇒ | | |
| | ⇐DONE⇐ | PASS THRU | ⇐DONE⇐ | STORE DATA | |
| | ⇒EXIT PASS THRU⇒ | EXIT PASS THRU | | | |
| | | | | | |

FIG. 9B

ELECTROMECHANICAL PARKING METER DOOR COMMUNICATIONS INTERFACE

This application claims priority under 35 U.S.C. §119(e) from provisional application Serial Nos. 60/198,385 filed Apr. 19, 2000, and Ser. No. 60/242,142 filed Oct. 23, 2000.

BACKGROUND OF THE INVENTION

1. Field of the Invention

This invention relates generally to electronic security systems, and more particularly to electronic security systems for money-containing devices such as parking meters, which must be periodically accessed by a collector in order to retrieve the funds accumulated in the device. While the preferred embodiment will be described with respect to a parking meter configuration, the invention could be used with other devices, such as pay telephones, bill changer machines, fare card machines, or vending machines, where a data collection and storage section of the device is separate from the money-containing vault section of the device.

2. Background and Prior Art

Typically, the collection of money from coin or currency operated devices such as parking meters, pay telephones, transit system fare card machines or the like is a costly and burdensome operation. For instance, a company may own tens or even hundreds of thousands of pay telephones for which tens or hundreds of thousands of keys must be kept in order to prevent the loss of a key from requiring the changing of locks on thousands of devices which would operate with the lost key.

Another problem involved with the collection of funds from currency operated devices is the possibility of fraud or theft by a collector. Typically, a collector should remove a locked coin box from the device and replace it with an empty lock box to which he does not have access. However, it is possible that a removed coin box will not be replaced with another lock box but rather will be replaced with an unlocked receptacle which can be later removed by that collector before turning in his key at the end of the collection shift.

Yet another cost involved in the collection process is the sheer manpower required for the task of distributing, collecting, and keeping track of many thousands of keys on a daily basis.

Another shortcoming in the art pertains to electronic parking meters having coin counting or auditing circuitry for keeping track of the amount of revenue collected by the meter. Such meters have separate upper (i.e. meter) and lower (i.e. coin vault) housings, wherein coins are fed into the upper housing, pass through a coin identification mechanism, and drop into a secure coin box or vault located in a locked lower housing. The upper housing has a coin counting/auditing circuit (typically provided on a circuit board) coupled to the coin identification mechanism, and stores information relating to the count of coins received since the last time the device was emptied. The coin counting/auditing circuit communicates inserted coin information to a meter circuit, which adds time to the meter in response to the monetary amount of coins inserted into the meter, according to a preprogrammed algorithm which specifies the number of minutes added for each domination of coin. The meter circuit typically is coupled to a display or other visual indicator that displays the amount of time remaining on the meter. The lower housing includes an electronic lock mechanism for interfacing with an electronic key system for accessing the coin vault.

In such systems, the coin audit information is retrieved from the electronic circuitry in the upper housing either by radio frequency transmission from the circuit in the upper housing to a separate handheld receiver device, or by transferring the information to a "smart" card inserted into a card slot provided in the upper housing. Alternatively, the circuitry in the upper housing may be wire-connected to the electronic lock circuitry within the lower housing containing the coin vault. Coin count information is passed from the circuit board in the upper housing to the lower housing by a flexible wire conductor hard-wired between the two circuit boards, from where it is sent to a handheld electronic key device once authorization has been verified. In such systems, a "living hinge" was created by a flexible wire between the two housings, and thus presented a poor design from an engineering and security viewpoint. Problems encountered with this system include frequent damage to the flexible wiring, due to pinching of the wiring between the door and the vault and due to wear from continued opening and closing of the door.

Parking meters typically are located on the streets of major cities, and are subject to vandalism and break-in attempts. The construction of prior art vault doors rendered them readily subject to such attacks by using simple tools such as a hammer and driver or chisel to punch the lock cylinder into the door and thereby gain access to the vault.

The electronics in the meter stores a large amount of data in addition to collected coin information. For example, the meter circuitry may store its status, meter identification information, zone information, e-cash purchase information, and profile data. It would be desirable to enable such data to be modified in the meter without the necessity of replacing the meter circuitry.

Although electronic security systems are known and have been used for various purposes, see e.g. U.S. Pat. Nos. 4,789,859, 4,738,334, 4,697,171, 4,438,426, applicants are unaware of any which specifically address the problems noted above. An example of a prior art vending machine including coin count audit information circuitry is disclosed in U.S. Pat. No. 4,369,442.

SUMMARY OF THE INVENTION

The present invention provides an electronic security system which overcomes the problems mentioned above and significantly reduces collection costs.

BRIEF DESCRIPTION OF THE DRAWINGS

The present invention will become more fully understood from the detailed description given hereinbelow and the accompanying drawings which are given by way of illustration only, and are not limitative of the present invention, and wherein:

FIGS. 9A and 9B are data flow tables for the meter, lock and access device according to a preferred embodiment of the invention.

DETAILED DESCRIPTION OF THE PREFERRED EMBODIMENTS

Figure 1:
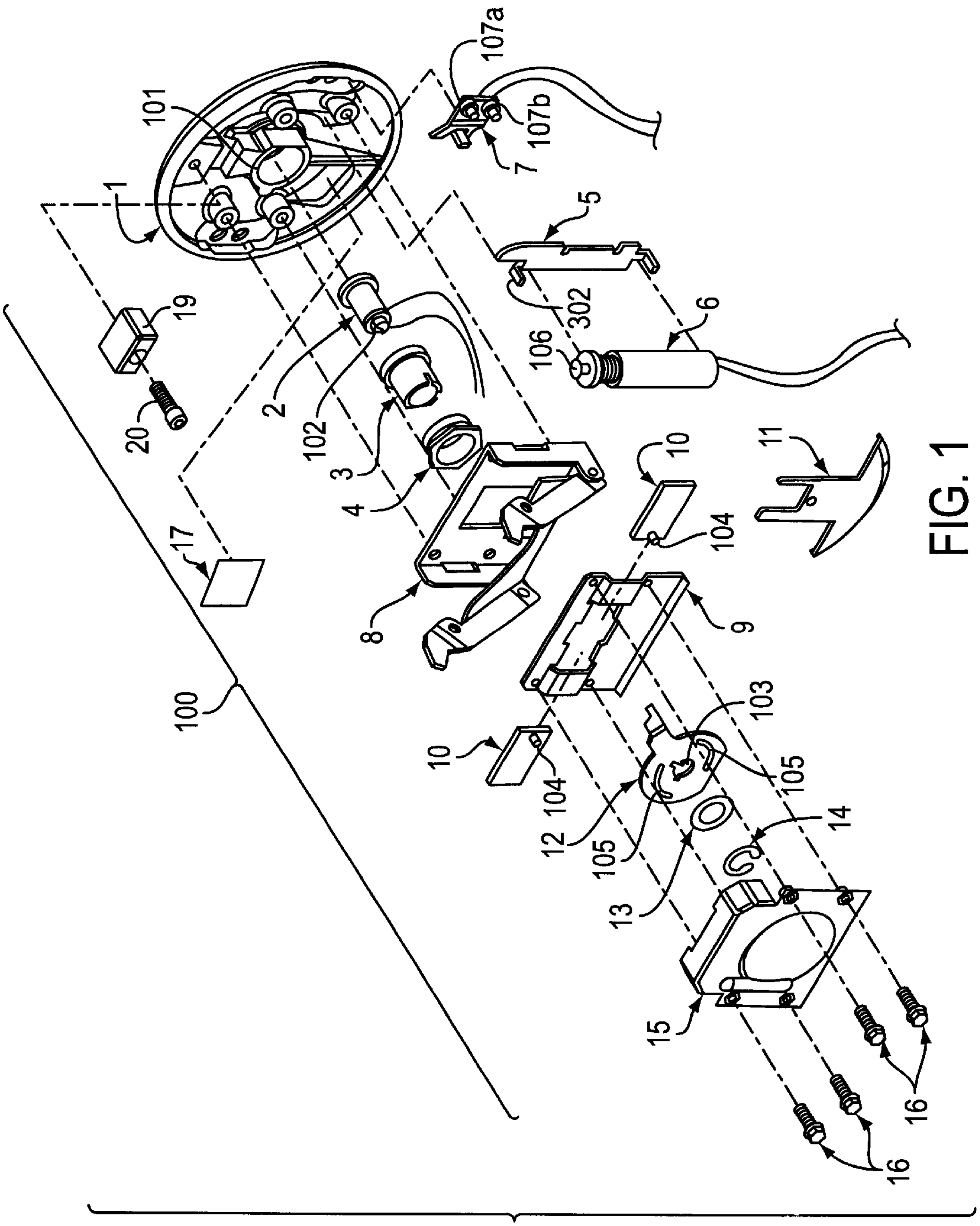
FIG. 1 is an exploded view of a vault door assembly according to one preferred embodiment of the present invention.
Figure 2:
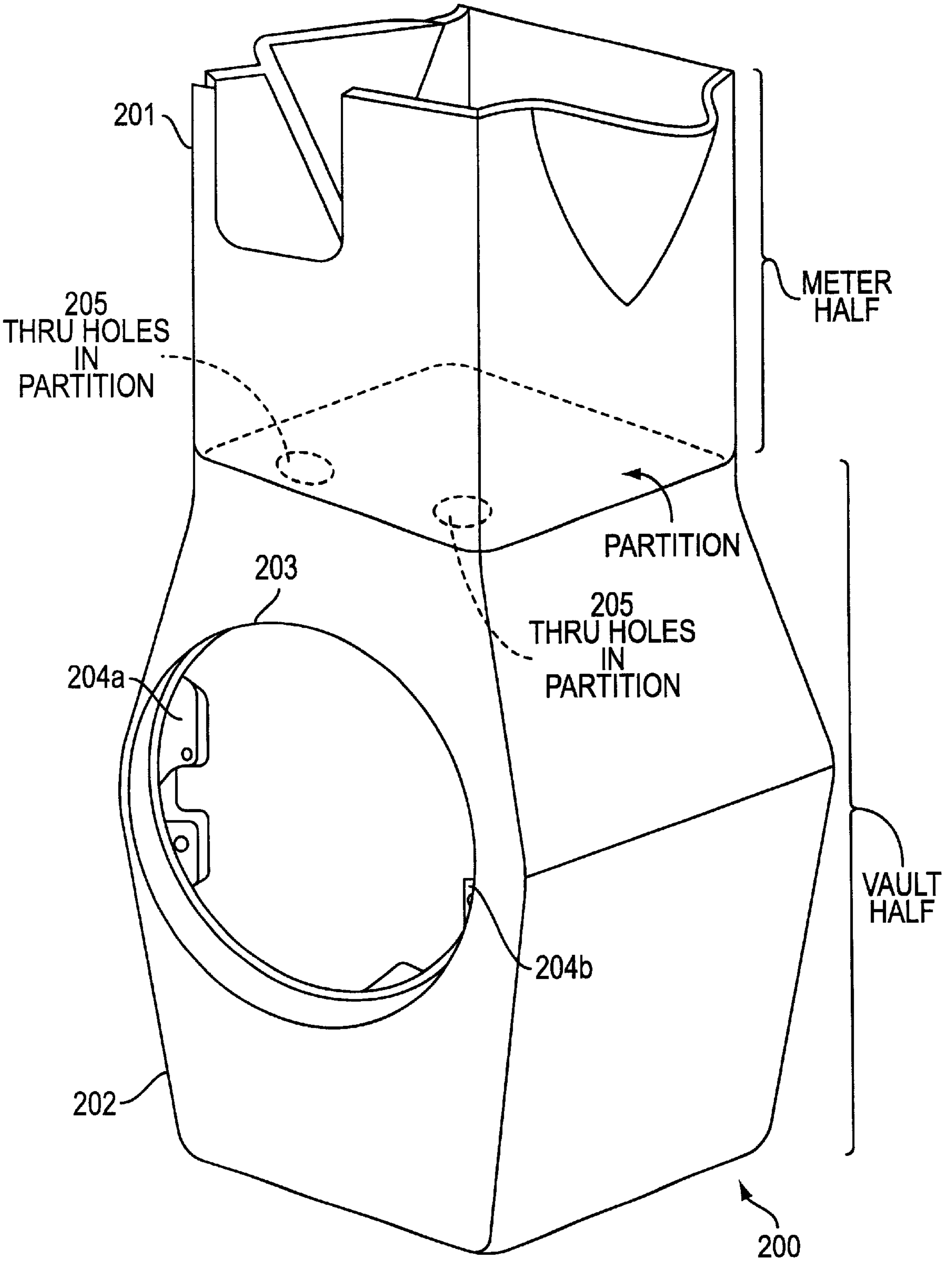
FIG. 2 is a perspective view of a two-part parking meter housing assembly used in one embodiment of the present invention.

FIG. 1 shows an electronic vault door for a parking meter according to a preferred embodiment of the invention. The parking meter housing 200 is shown in FIG. 2. The housing 200 includes an upper or meter half 201, and a lower or vault half 202. A pair of through-holes 205 provides a conduit between the two halves of the housing for wire conductors (to be described in detail below). The electronic vault door is mounted against hinge brackets 204*a*–204*b* in the vault opening 203. The vault door is locked in place over the vault opening 203 by rotating the plug assembly 2, which turns a locking cam 12 that is coupled to bolts 10. The cam 12 is turned to a locking position wherein the bolts 10 are moved outwardly and behind the brackets 204*a*–204*b* in the vault opening 203, thereby locking the vault door in place over the opening 203. To unlock the vault door for access to the vault, the cam 12 is turned in the opposite direction wherein the bolts 10 are retracted inward towards the center of the vault door, thereby allowing the service personnel to remove the vault door from the vault opening and to gain access to the contents of the vault.

As shown in FIG. 1, the vault door assembly 100 includes a metal vault door 1, a plug (lock cylinder) assembly 2 that is mounted inside a shell 3, which is inserted into a central aperture 101 in the vault door 1 and retained rotationally therein by shell retainer 11. A shell retainer bushing nut 4 is screw-threaded into the aperture 101 to retain the shell and plug assembly securely mounted in the vault door. A hinge assembly 8, bolt retainer bracket 9, and solenoid cover 15 are securely mounted to the vault door 1 with tri-groove security screws 16. Bolts 10 are held by retainer bracket 9. Pins 104 on bolts 10 are located inside grooves 105 in locking cam 12. A cam shaft 102 of plug assembly 2 is inserted into cam shaft opening 103 of locking cam 12 and retained by cam spacer 13 and retainer ring 14. A rubber door rest 19 is attached to the top of the vault door with a screw 20. The door rest 19 is used as a rest for the vault door 1 when removed from the vault.

A solenoid 6 is nested on the vault door 1 within a solenoid bracket 5. The solenoid 6 includes a plunger 106 that is normally spring-biased in an extended position (i.e., when the solenoid is not energized) that blocks rotation of the locking cam 12. A lock control circuit 17 in the form of a circuit board is mounted in a recess in the vault door, and is coupled via wire conductor(s) to a contact terminal on the face (not shown) of the plug assembly 2. The circuit board 17 also is coupled via wire conductor to the solenoid 6.

The control circuit 17 communicates with an electronic or electronic-mechanical key (not shown) inserted into the keyway of the plug assembly 2. The electronic/electronic-mechanical key contains a contact terminal that makes electrical contact with the terminal on the face of the plug 2 when the key is fully inserted into the keyway. When the control circuit 17 determines that an authorized key is inserted into the keyway of the plug, the control circuit energizes the solenoid 6, causing the solenoid plunger 106 to retract, allowing the key to turn the plug (and thereby rotate the locking cam 12) to retract the bolts 10. The operation of the electronic security system is described in U.S. Pat. No. 6,005,487 issued Dec. 21, 1999 to the same assignee as the present application, the disclosure of which is hereby incorporated by reference in its entirety. Accordingly, the description of operation will not be further described herein. The components 2–14 of the vault door assembly are covered by solenoid cover 15 which is mounted to the vault door via the screws 16 as shown.

Figure 6:
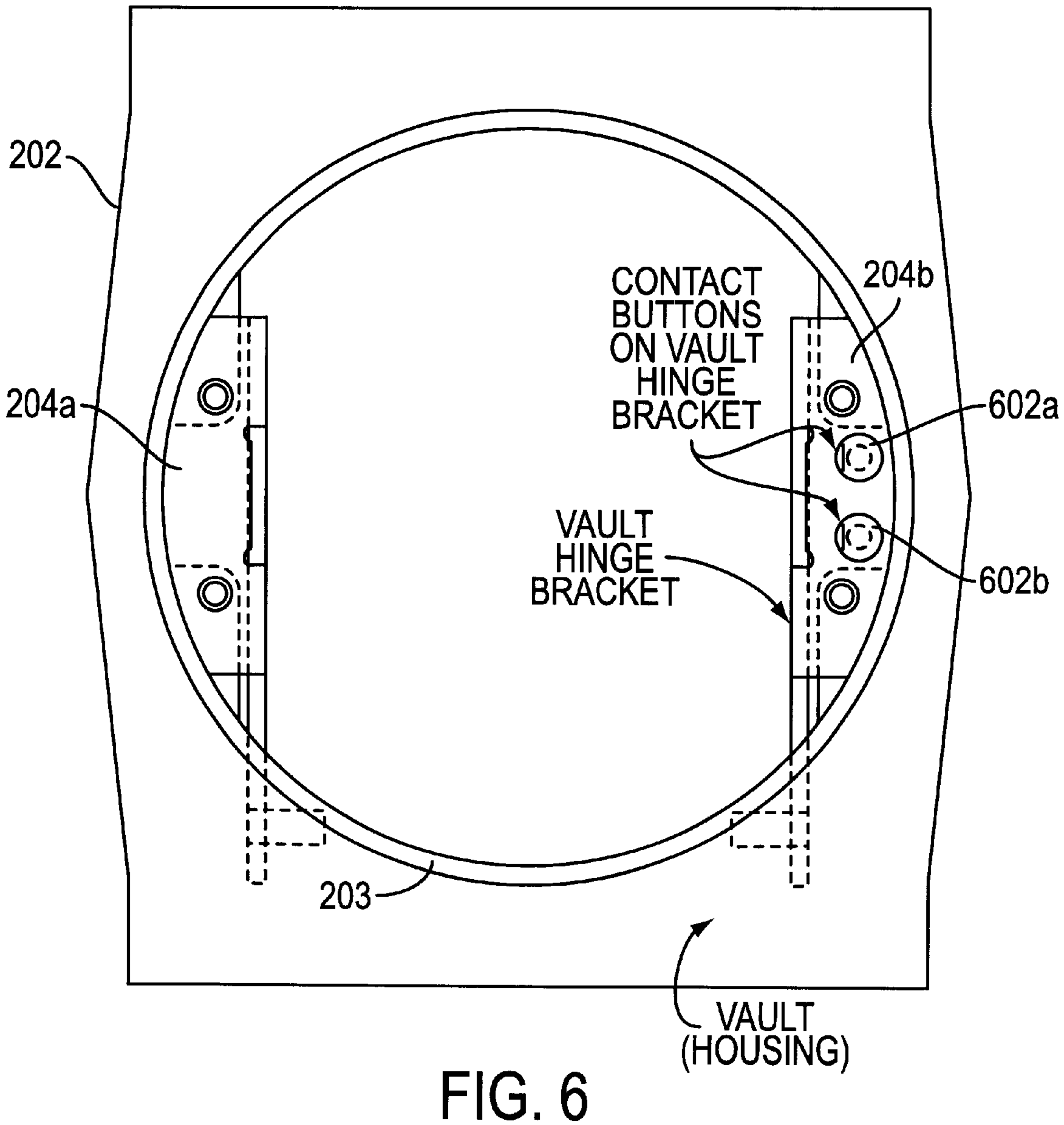
FIG. 6 is an elevational view of the vault door opening according to a preferred embodiment of the invention.
Figure 7A:
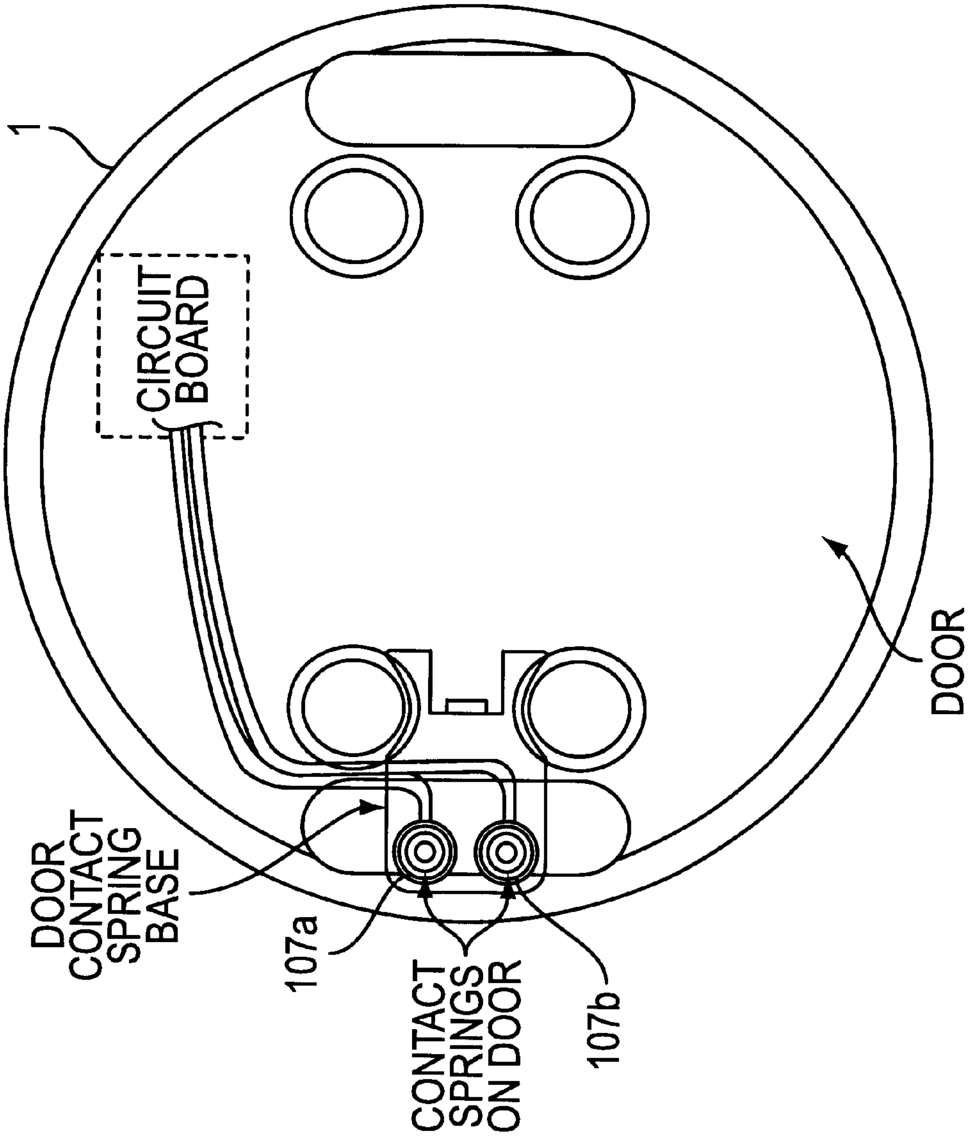
FIGS. 7A and 7B are elevational and side views, respectively, of the vault door according to the invention showing the details of the electrical spring contacts.
Figure 7B:
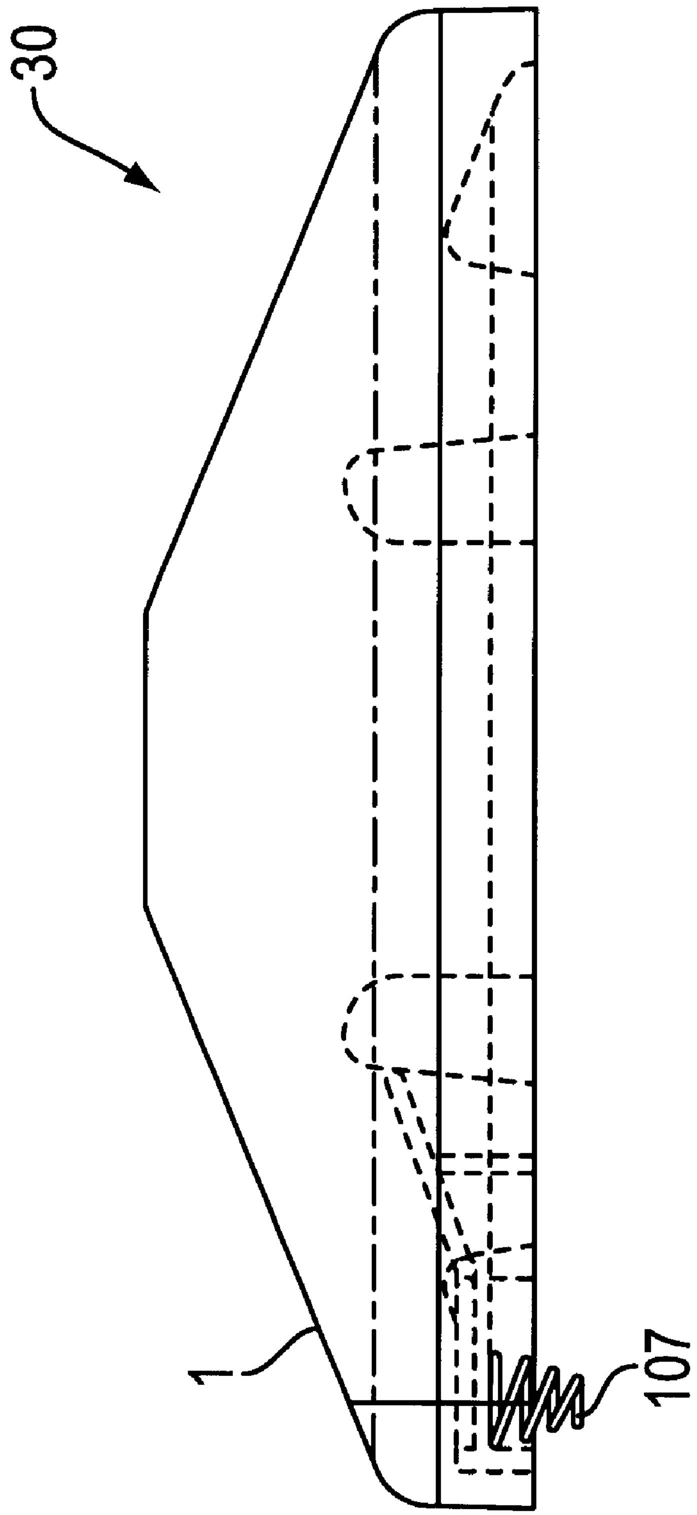
Figure 8:
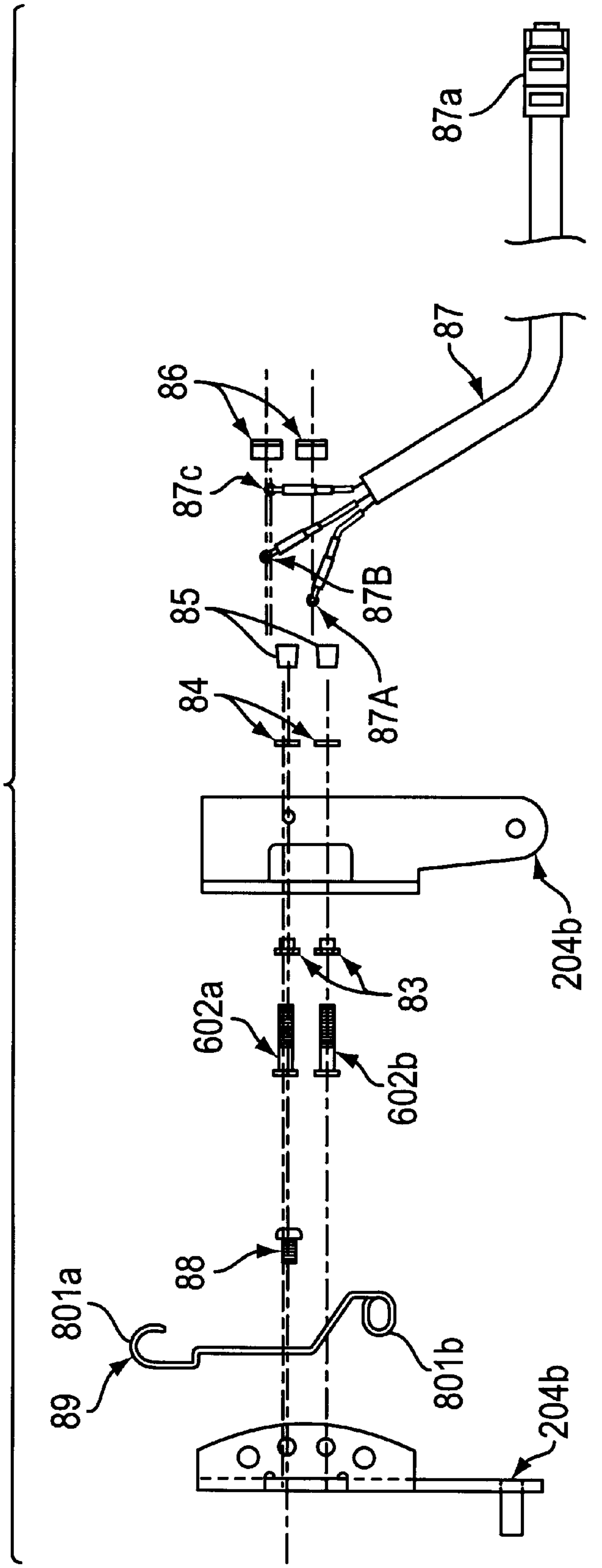
FIG. 8 is an exploded view of the housing hinge bracket assembly according to a preferred embodiment of the invention.

A contact base assembly 7 also is mounted on the vault door 1. The contact base assembly 7 includes a pair of metal spring contacts 107*a*, 107*b*, which are connected to the lock control circuit 17 via wire conductors (see also FIGS. 7A–7B). As shown in FIG. 6, two hinge brackets 204*a* and 204*b* are provided adjacent to the vault opening 203. Hinge bracket 204*b* includes a pair of flat-head metal contacts 602*a* and 602*b*, which make contact with the springs 107*a* and 107*b* of the vault door 1 when the vault door is locked in place in the vault opening. As shown in FIG. 8, contacts 602*a* and 602*b* are connected to an interface cable 87, the other end 87*a* of which is connected to an input/output terminal of the meter electronic circuit (not shown) located in the meter half 201 of the housing 200. The interface cable 87 is threaded through one of the through-holes 205 as shown in FIG. 2. The metal contact pins 602a, 602*b* are inserted into the bracket 204*b* via insulating washers 83, 84. Spacers 85 are provided on the ends of the contact pins 602*a* and 602*b* for connection of the wire terminals 87*a*–87*c* of the interface cable 87, which are secured to the contact pins with lock nuts 86. A wire form retainer 89 mounted to the bracket 204*b* with a screw 88 includes hook ends 801*a* and/or loop ends 801*b* through which the interface cable 87 is threaded. The wire form retainer is made of a stiff wire which does not easily bend, and it is oriented in a direction into the vault and away from the vault opening. The wire form retainer 89 functions as a guide to keep the interface cable 87 away from the vault opening and the vault door during access/reinstallation operations so as to avoid damage to the cable during collection operations.

Figure 3:
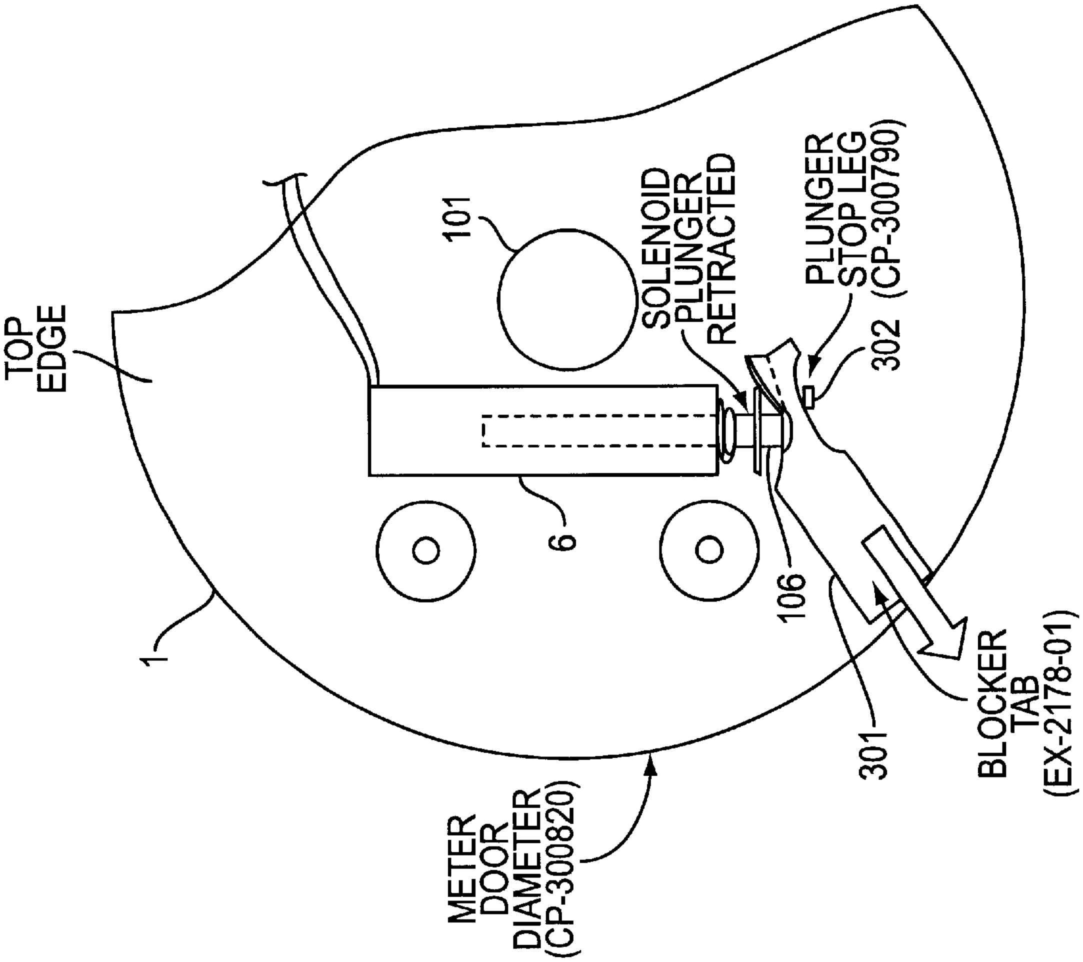
FIG. 3 is a partial cut-away view of the vault door showing the installation of a solenoid blocker tab according to the invention.
Figure 4:
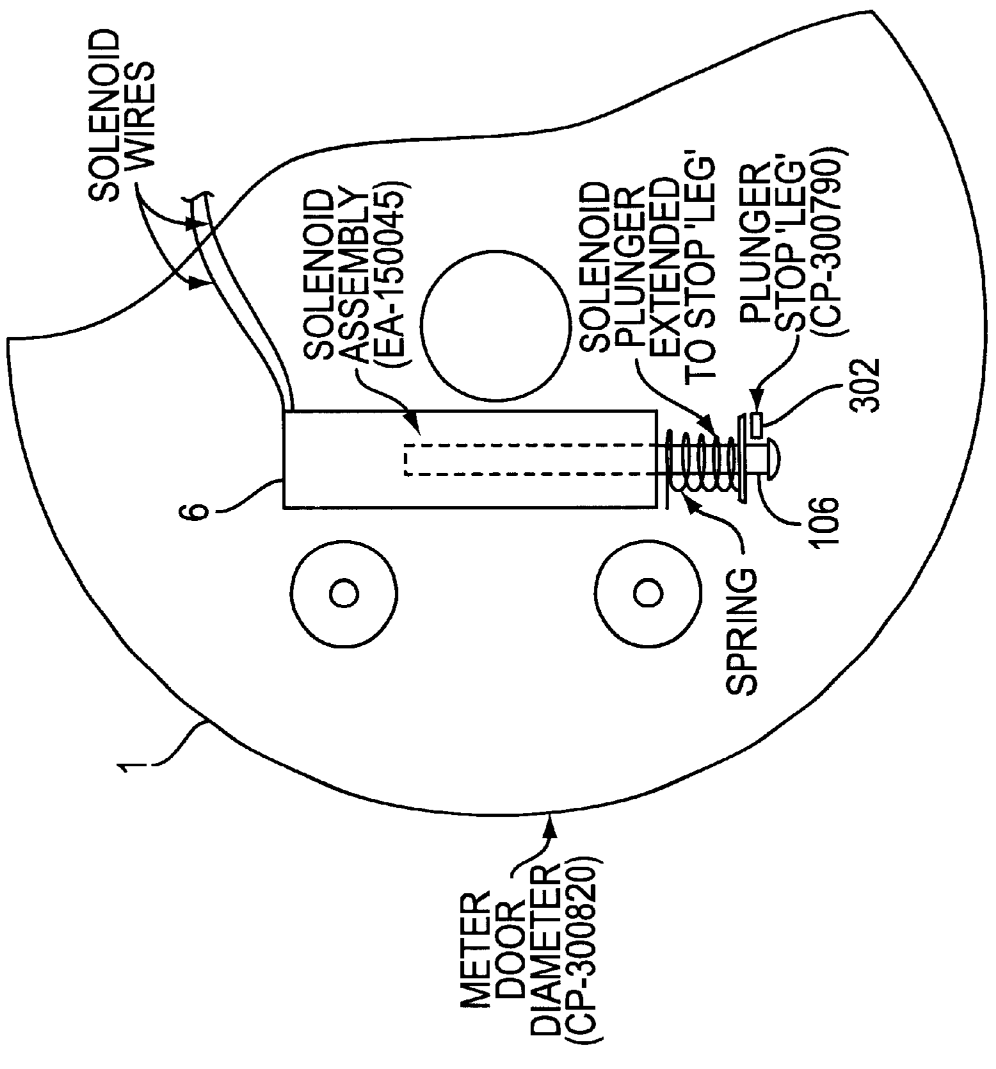
FIG. 4 is a partial cut-away view of the vault door showing the solenoid blocker tab removed to enable operation of the solenoid according to the invention.
Figure 5:
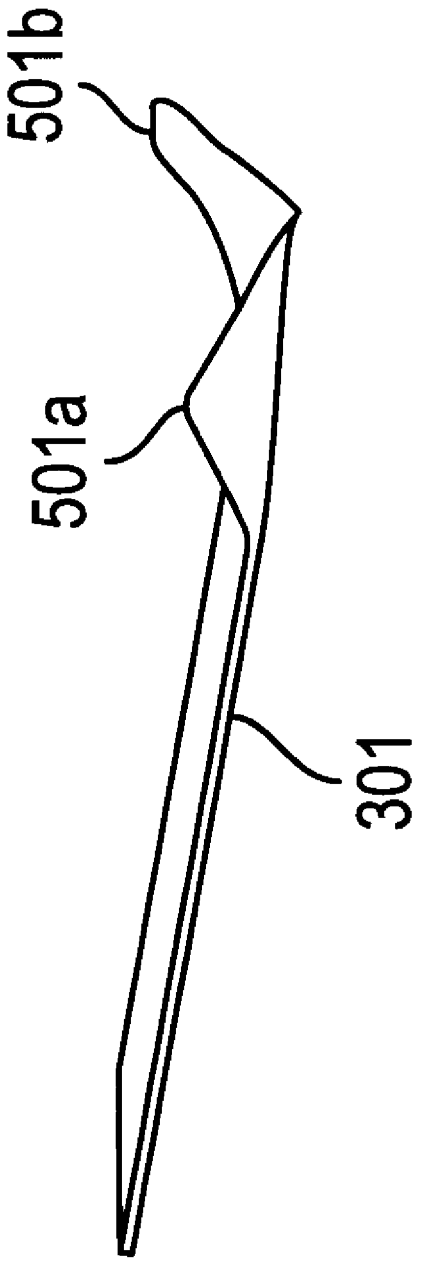
FIG. 5 is a perspective detail view of the solenoid blocker tab according to the invention.

According to another aspect of the invention, as shown in FIGS. 3–5, a blocker tab 301 is provided to disable the functioning of the solenoid plunger 106. The blocker tab is used in installations where no electronic lock functions are implemented, but only mechanical locking functions are provided. Such installations can be later upgraded to provide the more sophisticated electronic security/monitoring functions by adding or activating the lock control circuit board.

The blocker tab 301 contains two bent end tip portions 501*a* and 501*b* as shown in FIG. 5. The tab may be made of any relatively stiff material, and is preferably made of plastic. As shown in FIG. 3, the tab 301 is inserted between the solenoid plunger 106 and the plunger stop 302 (see also solenoid bracket 5, FIG. 1) such that the end tip portions 501*a* and 501*b* force the plunger 106 to its retracted position within the solenoid 6. At the time that the solenoid 6 needs to be activated, the blocker tab 301 is pulled out from between the plunger 106 and the plunger stop 302. This releases the plunger to its fully extended position against the plunger stop 302 as shown in FIG. 4.

FIGS. 9A and 9B illustrate various data flows between the parking meter circuit, the electronic lock circuit, and the handheld access device. When the meter is in a normal (operative) state, the lock is powered down. Time may be purchased on the meter either by insertion of coins into the provided coin slot, or by an electronic cash ("e-cash") transaction. Upon such purchase, the meter powers up the lock and transmits the purchase information to the lock. The lock then stores the information in an appropriate memory location, and sends back to the meter an acknowledgment signal indicating that the purchase information was successfully transmitted to the lock and processed. After a predetermined time period has elapsed with no additional purchase activity, the meter removes power from the lock.

Upon a change in meter status (such as from a ready state to a disabled state, etc.) the meter powers up the lock, waits to receive a ready signal from the lock, sends to the lock the new status, and waits for an acknowledgment from the lock.

When a collector inserts an access device into the lock, the access device provides power to the lock which places the lock in a wake-up state. The lock notifies the meter that a collection wake-up has occurred. The lock sends a challenge to the access device and waits for a response. If a correct response is received from the access device, the lock sends an acknowledgment to the access device. The access device then sends an open command and the current time to the lock. The lock sends the access time information to the meter circuit, where it is stored. The meter sends an acknowledgment to the lock, and the lock circuit then enables the lock to be opened by the collector. While the vault door is open, the lock circuit provides from its memory to the access device memory data including coin data, e-cash purchases, the meter ID, the meter status, the meter profile ID, and the meter zone ID. Upon successful receipt of this information, the access device sends an acknowledgment to the lock circuit. When the collection is completed, the collector closes the vault door, re-establishing contact between the lock circuit and the meter circuit. The lock circuit then sends a "collection done" signal to the meter indicating the completion of the collection operation. The lock is powered down upon removal of the access device.

The access device also may communicate directly with the meter circuit in a pass-through mode of operation, in which the lock circuit simply passes information signals between the access device and the meter circuit. In this mode, the vault door remains closed. The service personnel inserts the access device, which powers the lock, and the lock and access device conduct the challenge-and-response routine as described above. Upon receipt of the acknowledgment from the lock indicating a proper challenge response, the access device sends an audit command to the meter circuit. In this mode, the meter circuit sends audit data, including the data mentioned above, to the access device. The access device also may update the meter to load a new profile, change zone information, or change other meter information stored in the memory of the meter circuit. When the audit operation is complete, the access device sends a done signal to the meter. The meter then sends an "exit pass through" command to the lock to take the lock out of pass through mode and power down the lock. The meter alternatively may allow the lock to be powered down upon removal of the key from the lock interface.

The invention being thus described, it will be apparent to those skilled in the art that the same may be varied in many ways without departing from the spirit and scope of the invention. For example, while the spring contacts in the illustrated embodiment are provided on the vault door, they may be provided equivalently on the housing hinge bracket. Additionally, while in the illustrated embodiments the contacts between the vault door and the housing hinge bracket are metal contacts, such contacts equivalently may be provided as optocoupler contacts, without metal-to-metal connection. These and all other such modifications are intended to be included within the scope of the following claims.

What is claimed is:

1. An electronic parking meter, comprising:

a first section including at least one coin slot for accepting coins, a coin counting/auditing circuit operatively coupled to said at least one coin slot for keeping track of the value of coins inserted into the meter;

a second section including a lock accessible by presenting specific data thereto, and a lock control circuit for unlocking said lock based on received specific data through a key interface; and an access device for operating said lock, comprising means for storing data for presentation to said lock control circuit, means for storing information for presentation to said coin counting/auditing circuit, and means for storing information received from said coin counting/auditing circuit;

said second section including a vault having an opening and a vault door for covering said opening, said lock and lock control circuit being located on said vault door such that said lock locks said vault door in place over said vault opening, said vault door including at least one electrical communication terminal connected to said lock control circuit by a wire conductor;

said vault opening including at least one electrical communication terminal for coupling with the vault door communication terminal when the vault door is secured within the vault opening, said vault opening communication terminal being connected to said coin counting/auditing circuit by an interface cable.

2. An electronic parking meter as set forth in claim 1, wherein the electrical communication terminals of the vault door and the vault opening are electrical contact terminals, the electrical contact terminal of the vault door including a spring for making contact with the electrical contact terminal of the vault opening.

3. An electronic parking meter as set forth in claim 1, wherein the electrical contact terminal of the vault opening is provided on a housing bracket mounted at a periphery of said vault opening.

4. An electronic parking meter as set forth in claim 1, wherein said access device is capable of communicating directly with said coin counting/auditing circuit through said lock circuit, when said vault door is mounted in said vault opening.

5. An electronic parking meter as set forth in claim 4, wherein said access device is capable of modifying information in said coin counting/auditing circuit to modify operation of said parking meter.

6. An electronic parking meter as set forth in claim 1, wherein said coin counting/auditing circuit sends information to said lock control circuit to be stored in said lock control circuit for transmission to said access device upon proper coupling of said access device to said lock.

7. An electronic parking meter as set forth in claim 5, wherein information capable of being modified in said coin counting/auditing circuit includes meter ID, meter zone ID, and meter status.

8. In an electronic parking meter having a first section including at least one coin slot for accepting coins, a coin counting/auditing circuit operatively coupled to said at least one coin slot for keeping track of the value of coins inserted into the meter, a second section including a lock accessible by presenting specific data thereto, a lock control circuit for unlocking said lock based on received specific data through a key interface, and a vault having an opening and a vault door for covering said opening, said lock and lock control circuit being located on said vault door such that said lock locks said vault door in place over said vault opening, the improvement comprising:

said vault door including at least one electrical communication terminal connected to said lock control circuit by a wire conductor;

said vault opening including at least one electrical communication terminal for coupling with the vault door communication terminal when the vault door is secured within the vault opening, said vault opening communication terminal being connected to said coin counting/auditing circuit by an interface cable.

9. An electronic parking meter as set forth in claim 8, wherein the electrical communication terminals of the vault door and the vault opening are electrical contact terminals, and wherein the electrical contact terminal of the vault door includes a spring for making contact with the electrical contact terminal of the vault opening.

10. An electronic parking meter as set forth in claim 9, wherein the electrical contact terminal of the vault opening is provided on a housing bracket mounted at a periphery of said vault opening.

11. An electronic parking meter as set forth in claim 8, wherein said access device is capable of communicating directly with said coin counting/auditing circuit through said lock circuit, when said vault door is mounted in said vault opening.

* * * * *